Feb. 10, 1942.  J. G. MARSHALL ET AL  2,272,979
ACETYLENE GENERATION
Filed April 8, 1938  2 Sheets-Sheet 2
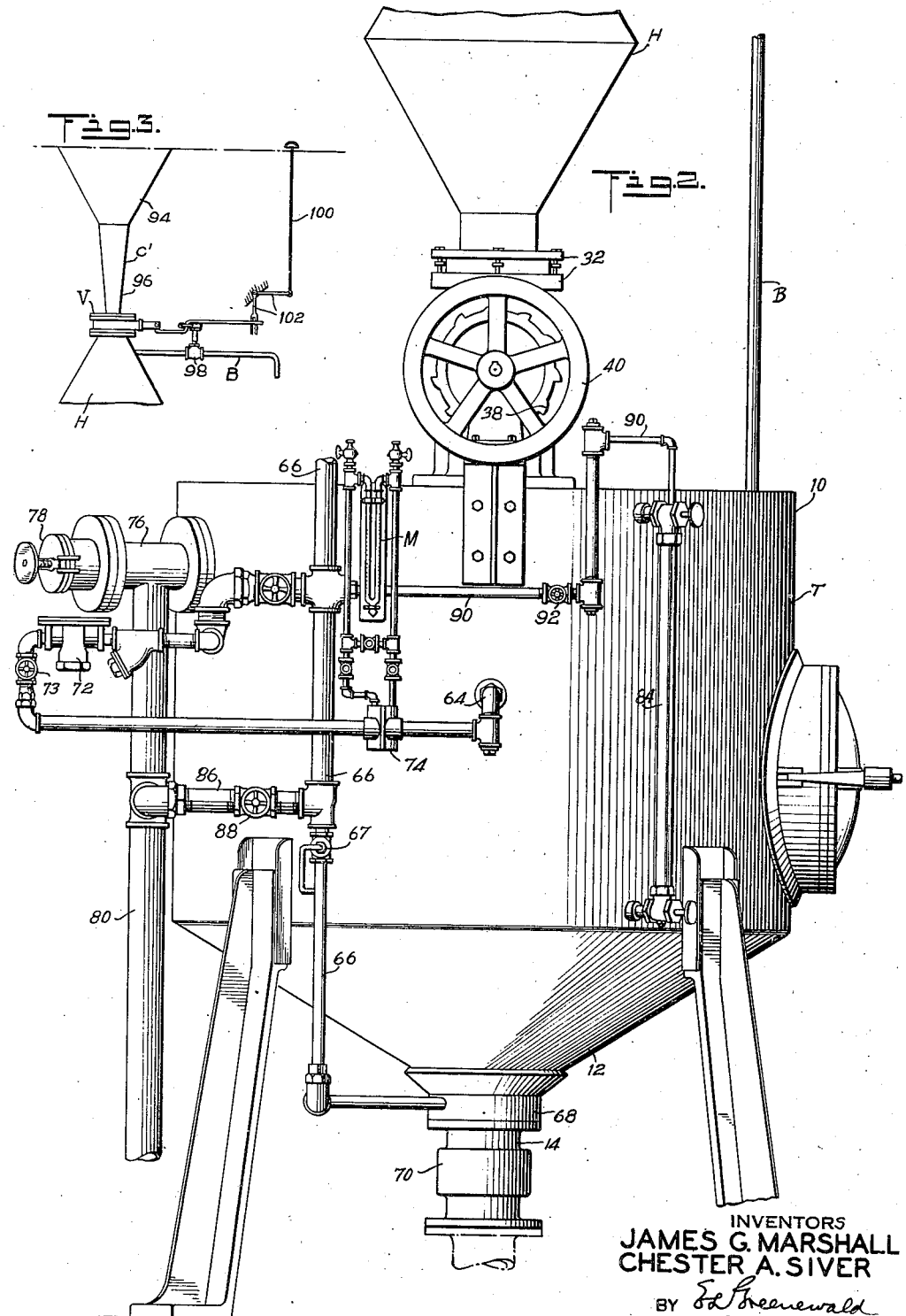
INVENTORS
JAMES G. MARSHALL
CHESTER A. SIVER
BY
ATTORNEY

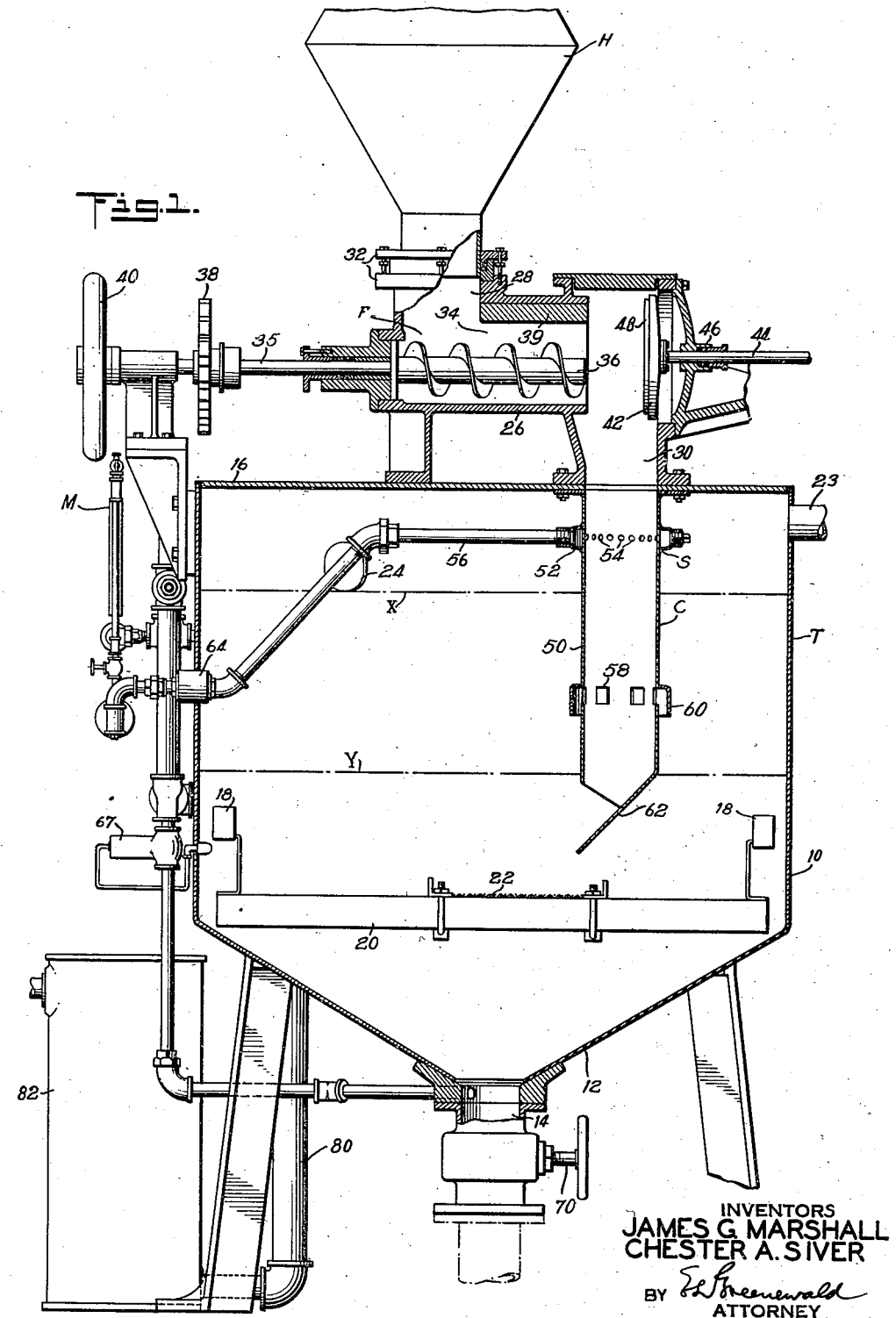

UNITED STATES PATENT OFFICE 2,272,979

ACETYLENE GENERATION

James G. Marshall, Niagara Falls, N. Y., and Chester A. Siver, Indianapolis, Ind., assignors to The Prest-O-Lite Company, Inc., a corporation of New York Application April 8, 1938, Serial No. 200,834

20 Claims. (Cl. 48—54)

This invention relates to a method of and apparatus for producing acetylene gas, and particularly to a method of generating acetylene and to acetylene generators capable of efficiently utilizing run-of-crusher calcium carbide.

Run-of-crusher carbide includes miscellaneous sizes of carbide, considerable fines, and dust. The operation of sizing and grading such carbide imposes an additional production cost. The bulk density of sized carbide is low, and hence the cost of shipping containers is higher per pound than for run-of-crusher carbide. If the fines must be discarded, the cost of their production is naturally borne by the useful product. Even more important, perhaps, is the fact that during the sizing and grading operations a certain amount of gas is evolved, and this results in a degraded product. Inasmuch as the amount of gas thus lost depends to some extent on atmospheric humidity, it becomes impossible to avoid a seasonal variation in the quality of the sized and graded product.

The use of run-of-crusher carbide as previously practiced possessed certain disadvantages in that the carbide fines and dust tended to form "islands" on the surface of the water within the generator. The islands may gradually increase in size, and then suddenly capsize and sink, with the result that there is a rapid generation of gas; a sudden rise of pressure in the gas collecting system; local overheating; and splashing of carbide and sludge onto the upper portions of the generator chamber, or of water into the carbide feeding apparatus, where further local overheating occurs.

For the above reasons, many proposals have been made for modifications in the construction of acetylene generators so that they may efficiently utilize run-of-crusher carbide. These proposals usually include mechanical agitators; water sprays directed onto the carbide as it is fed to the water within the generator for the purpose of breaking up any floating islands that may form; and water jets within carbide directing chutes for forcing the carbide fines and dust to a point below the surface of the water in the generator. While these proposed devices accomplish to some degree the purposes for which they have been designed, it is found that their operation is not entirely satisfactory, because they permit the carbide fines to circulate throughout the water within the generator. Additionally, with such devices, balls of carbide dust may be formed and held together by the pasty condition of the dust as it reacts with the water. These dust balls will float to the top of the water within the generator thus forming "islands" which will cause local overheating and incandescent spots within the generator.

Acetylene generators of the carbide-to-water type require a certain amount of water per pound of carbide fed thereto in order to prevent overheating of the generator. When it is desired to generate great quantities of acetylene the necessary water becomes excessive. It has been proposed to employ a relatively small water chamber, and to continually replenish the water therein from an external source in order to maintain the temperature of the generator within proper limits. Usually, such generators are equipped with an overflow provided with a seal pot to prevent loss of acetylene gas. Since the solubility of acetylene varies inversely as the temperature of the water, generators in which the water at the overflow is at a low temperature have high losses of dissolved acetylene through the overflow.

The carbide hoppers of acetylene generators of the continuous or semi-continuous types are usually provided with a double bell or a double valve at their charging ends. The introduction of calcium carbide into a hopper of this type results in the displacement of acetylene therein into the generator room as well as the introduction of some air into the hopper. Such displaced acetylene not only entails a loss, but constitutes a potential explosion hazard. The air introduced into the hopper and subsequently into the generator itself, contaminates and lowers the qualtity of the acetylene produced.

An object of this invention is to provide an acetylene generator of simple construction which is capable of efficiently utilizing run-of-crusher carbide.

Other objects of this invention include: the provision of an acetylene generator capable of utilizing run-of-crusher carbide and effecting the complete and immediate reaction of the carbide fines and dust while preventing the same from circulating throughout the water within the generator; the provision of such a generator in which the water therein may be continuously replenished by a jet of water adapted to continuously agitate a confined surface portion thereof within which the carbide fines and dust are retained; the method of generating acetylene in such a generator in which the water spray is so controlled that the reaction between the calcium carbide and the water causes a rise in temperature of the latter to a point where a minimum of acetylene gas will be dissolved in the water passing through the overflow; the provision of such a generator in which the large lumps of carbide are directed to a point below the surface of the water within the generator and the carbide dust and fines are retained in a confined portion of said water until they become completely reacted with the water therein; the provision of such a generator having a carbide-feeding device including a conveyor, such device being so constructed and arranged as to prevent gravity flow of carbide fines past the conveyor when the latter is stationary; the provision of such a generator in which the carbide hopper is provided with means for changing the same without admitting any air thereto and preventing the escape of acetylene therefrom; and the provision of such a generator in which the carbide hopper is provided with means for displacing the acetylene therein into the gas collecting portion of the generator when the hopper is charged.

The above and other objects and the novel features of the invention will become apparent from the following specification and the accompanying drawings, in which:

Fig. 1 is a sectional elevational view of an acetylene generator to which the principles of this invention have been applied;

Fig. 2 is an elevational view of the generator shown in Fig. 1, showing the arrangement of various auxiliary equipment necessary for a clear understanding of the invention; and Fig. 3 is a reduced elevational view of the upper end of the carbide hopper of Figs. 1 and 2 showing the improved carbide charging apparatus.

The invention is shown as applied to a carbide-to-water acetylene generator including a tank T adapted to contain water in its lower portion and to confine acetylene gas in its upper portion. The generator is further provided with a carbide hopper H and a screw conveyor feed F leading from the hopper outlet to a chute C which latter is connected to the tank T. The hopper H is provided with a single slide valve V, a choke feed C' and a by-pass B (see Figs. 2 and 3). The by-pass B is provided with a valve which is simultaneously operated with the valve V so that when carbide is fed into the hopper H the acetylene therein will be displaced through the by-pass B and into the tank T.

By means of the carbide-feeding device F, the hopper outlet communicates with the inlet end of a depending device or chute C having its open lower, or outlet end extending to a point below the lowest water level within tank T. A water spraying means S is located within the chute C and is adapted to spray water transversely of the axis of said chute and onto the carbide flowing by gravity down through the chute C and into the water within tank T. The chute C is further provided with means for permitting the gas generated therein to pass into the gas collecting space of the tank T and still prevent the circulation of the carbide fines throughout the water in said tank. The water for the spray S is introduced through a system including valves, metering orifices, and a manometer M for controlling the amount of water added to the tank T by the spray S.

Referring specifically to Fig. 1 of the drawings, the tank T comprises a substantially cylindrical shell or casing 10 having an inverted conical base 12, at the apex of which is fixed a drain outlet 14. The shell 10 is closed at its top by cover 16 upon which the carbide-feeding mechanism F and hopper H are adapted to be supported. The shell 10 is provided with a pair of supports 18 attached to its inner surface and adapted to support a cross member 20 upon which a carbide retaining screen 22 is securely fastened. The shell 10 is further provided with an acetylene outlet 23, and a water overflow 24, the latter to be described later.

The carbide-feeding device F comprises a housing 26 provided with an inlet 28 and an outlet 30. The housing 26 is secured to the top 16 of the tank T with the outlet 30 in alignment with an opening passing through said top. The inlet 28 is connected to the hopper H by a packing gland 32. The feeding device F also includes a horizontally disposed conveyor chamber 34 within which a screw conveyor 36 is positioned. The conveyor 36 is mounted on one end of a shaft 35, and is rotatively driven by a prime mover (not shown) which is adapted to drive a ratchet wheel 38 fixed to an extended portion of shaft 35. Manual rotation of the conveyor 36 may be effected by providing a handwheel 40 securely attached to the outermost end of the shaft 35. The horizontally disposed chamber 34 provides sufficient clearance around the screw 36 to facilitate handling lump carbide. However, when run-of-crusher carbide is used, the dust and fines may flow past the screw conveyor 36 by gravity, even when the conveyor is stationary. In order to prevent such flow, a block 39 may be positioned in the chamber 34. This block may be removed when sized carbide only is to be used. The chamber 34 is adapted to exit into the vertically disposed outlet 30 of the housing 26. When it is desired to shut down the generator over an extended period, and to prevent any of the carbide fines from sifting past the conveyor 36, the exit of chamber 34 may be closed by a cover plate 42 fixed to the end of a shaft 44 mounted for horizontal reciprocation within a packing gland 46 in the end of housing 26 which is opposite the end through which the drive shaft 35 extends. The cover plate 42 is provided with a sealing ring 48 adapted to cooperate with the end of chamber 34.

The chute C is disposed so that its main axis is substantially vertical, and the chute is fixed to the under surface of top 16 in alignment with the outlet 30 leading from the housing 26. The chute C comprises a substantially cylindrical sheet metal element 50 extending downwardly into the tank T to a point substantially below the normal water level X thereof and slightly below the initial water lever Y. The cylindrical element 50 is equipped with the spray S, which comprises a channel member 52 welded or otherwise fastened to the element 50 and adapted to distribute water to a series of spray holes 54 equally spaced about and communicating with the annular space formed by the channel 52 and the outside of element 50. Water is introduced to the channel 52 by a pipe system 56 to be described later. The element 50 is additionally provided with gas release means such as a row of gas vents or holes 58 equally spaced about its periphery and located at a point substantially below the normal, and above the initial water level within the tank T. The location of the vents 58 is such that, during normal operation, the gas released therethrough passes through the water in the tank T; and yet, the vents 58 are so located that the pressure of the gas released therethrough will not effect too great a differential of water pressure between the tank T and the chute C to cause the water within the latter to rise or vibrate with sufficient force to carry a part thereof up into the screw housing 34 due to its inertia.

An imperforate shield or baffle 60 is attached to the outside of element 50. It extends circumferentially of and overlies vents 58 and is provided with a skirt portion depending below and spaced from the lower edges of the vents. Thus it is seen that from the time the water level within the tank T rises to the bottom of the shield 60, the gas generated within the element 50, by the reaction of the carbide fines and dust confined therein, may pass therefrom only by flowing through the water within tank T and collects above the water in said tank. By virtue of the water seal provided by the depending skirt portion of the shield 60, the water level within the element 50 will normally remain below the lower edges of the vents 58, and the carbide fines and dust will be retained within element 50. The element 50 is additionally provided with a directing element 62 at its lower end, adapted to direct the lumps of carbide onto the screen 22 where they are supported until they have completely reacted with the water within tank T; the sludge formed therefrom passes through the screen 22 and collects within the inverted conical portion 12 of the tank T.

The pipe system 56 comprises a portion within the shell 10, connected at its one end to the channel 52, and at its other end to a pipe fitting 64 located in the side wall of shell 10.

Referring to Fig. 2 of the drawings, a supply pipe 66 is connected to a source of water, and is adapted to deliver the same to the bottom of tank T, and to the water spray S. The pipe 66 is connected to the bottom of the inverted conical portion 12 by a fitting 68. The connection is such that the incoming water is directed tangentially to the inner periphery of the outlet 14. Fitting 68 is also provided with a residue valve 70 for withdrawing the sludge from the bottom of the tank T. The water inlet is located at the lowest portion of the tank T and it possesses the triple function of supplying water to the generator, stirring the sludge, and adequately washing the sludge out of the drain 14.

The inlet water supply pipe 66 is also connected to a regulator 72, a valve 73, and thence to the fitting 64. Appropriate valves, besides those specifically mentioned, are located throughout the water supply system for adequately controlling the flow of water to the generator. For the purpose of controlling the amount of water sprayed into the chute C, a metering orifice 74 is located between the pipe connection 64 and the valve 73. A manometer M is connected to opposite sides of the metering orifice 74 for indicating the rate of flow of water to the spray S.

As previously stated, the solubility of acetylene varies inversely as the temperature of the water, and it is accordingly desirable to raise the temperature of the water, and to maintain it between 140° and 180° F. during the normal operation of the generator.

The shell 10 is of insufficient capacity to contain enough water to prevent overheating of the generator during operation unless the same is continually withdrawn and replenished from an external source. It has, therefore, been provided with the overflow 24 in its vertical side wall and near the cover 16. In many instances, the entire amount of water to be added during any given run, in order to maintain the temperature thereof within the above limits, may be in excess of that necessary to adequately spray the carbide fines within chute C. Accordingly, a portion of this water may be added to the generator through the pipe 66 and the fitting 68 simultaneously with that portion which is added through the spray S. The water added through the fitting 68 at the bottom of the tank T will effect continuous stirring of the sludge within the generator to thereby cause complete reaction of any lumps of carbide which may become embedded therein. The amount of water added through the fitting 68 may be regulated by a temperature-controlled valve 67 so that the temperature of the water within tank T may be maintained below the maximum of 180° F. The rate of flow of the water through the spray S and the rate of carbide feed must, therefore, be coordinated to some extent. As long as the temperature of the water in the tank reaches about 140° F. before overflow begins, it does not matter how long before, because the temperature control valve 67 will open, adding a sufficient amount of water to maintain the temperature at about 140° F. once said temperature is reached. Thus, water is continually added to the shell 10 through the spray S, and intermittently through the fitting 68. It is continually withdrawn from the shell 10 through the overflow 24 after it reaches the level of the overflow. The operation of the generator may thus be controlled so that sufficient additional water may be added from an external source to prevent overheating of the generator during operation.

A pipe T 76 is connected to the exterior of the shell 10 at the point where the overflow 24 is located. The pipe T 76 is provided with a cleanout door 78 and a vertically disposed overflow pipe 80. The lower extremity of the pipe 80 is provided with a trap or seal pot 82 (see Fig. 1) in order to prevent any escape of acetylene gas from the shell 10 through the overflow 24. A gage glass 84 of usual construction is connected to the outside of the shell 10 at points near the top and bottom thereof in order to ascertain the level of the water therein.

During the operation of the generator, the various pipe lines just described may become clogged with lime from the generator, and means have been provided for flushing the pipes with a stream of water from the water supply pipe 66. Thus, the cross pipe 86 is provided between the water supply pipe 66 and the overflow drain pipe 80. A valve 88 is provided in the cross pipe 86 for by-passing supply water through the drain pipe 80 in order to clean the same. Likewise, the supply pipe 66 is connected to the top of the gage glass 84 by a blowout pipe 90 having a valve 92 therein.

Referring to Fig. 3, the hopper H is provided with a single slide valve V for admitting successive charges of carbide thereto. In order to prevent the admission of air to the hopper H and the escape of acetylene therefrom when the hopper is being charged, a hollow open-ended element such as a valveless choke feed device C' is connected to the valve V. The choke feed device C' comprises a carbide receiving portion 94 open at its one end to the atmosphere. The other end of the portion 94 is connected to a relatively long gradually tapering or constricted throat portion 96. The tapering throat portion is preferably about 2 feet long, frusto-conical in shape, and is provided with a taper of approximately 1 inch per foot.

The acetylene which collects within hopper H is by-passed to the gas collecting portion of tank T by the by-pass B. A valve 98 is provided in the by-pass B, and is adapted to be simultaneously opened with the opening of valve V by operation of a pull rod 100 which is connected to the valves V and 98 by a system including a bell crank lever 102.

Thus it is seen that cans of carbide may be up-ended into the carbide receiving portion 94 of the choke feed device C' and the tapered portion 96 thereof causes the run-of-crusher carbide to become packed sufficiently tight to prevent the entrance of air into the hopper H when the valves V and 98 are opened. Upon opening of these valves, the carbide is fed into the hopper H, and the acetylene within said hopper is displaced through the by-pass B into the tank T.

The mechanism is particularly adapted to the feeding of run-of-crusher carbide, which, as previously explained, consists of carbide of mixed sizes including large and fine particles. Such a mixture acts most effectively in building up pressure in the choke feed section 96. The gas pressure that will be developed in the generator hopper H, when the same is being charged, will be proportional to the flow of carbide through the valve V, to the size of the vent line B, and the opening of valve 98. While a pressure as high as thirty-six inches of water may be achieved by selecting suitable dimensions for the apparatus, the valves and vent lines are best proportioned to give pressures slightly in excess of the normal working pressure of the generator. In this way a smooth operation is insured, and gas pressures sufficient to impede the flow of carbide are avoided. Pressures of eight to ten inches of water will be normal for most generators.

Initially, the water level within the shell 10 is located just above the lower end of element 50 so that the carbide fines will be retained in the element 50 at all times. Sufficient carbide is fed into the tank to raise the water in the tank to raise the temperature thereof to about 140° F. by the time the water level reaches the overflow as a result of the addition of water through spray S and fitting 68 as described above. As the carbide is fed through the opening 30, it is sprayed with the water from spray S. The large lumps of carbide fall through the water confined within the chute C, thereby agitating the same and are deflected by the element 62 onto the screen 22 where they react with the water and form acetylene which collects in the upper portion of the shell 10. The carbide fines and dust are retained or confined within the carbide feed chute C, floating to the surface of the water confined therein, and the water jets spraying water over this entire restricted surface maintain the same in a thoroughly agitated state, thus effectively and immediately causing the dust and fines to be completely reacted with the water. As the water within the generator rises, the gas pressure within chute C prevents it from rising therein beyond the openings 58. The water continues to rise on the outside of the chute C until it reaches the water overflow 24. When the temperature of the water reaches the desired value, the temperature controlled valve 67 automatically admits additional water to the generator through the fitting 68, to maintain the temperature of the water within the desired limits. By means of the vents 58, the acetylene generated within the chute C is permitted to escape into the main body of water within shell 10 and to be collected above the same in the common gas-collecting chamber. The skirt portion of the shield 60 provides a water seal with the water in tank T which prevents the circulation of the carbide fines and dust throughout the water in the tank. The residue from the dust and carbide fines finally precipitates through the open end of the chute C and settles with the sludge into the inverted conical portion 12 of the tank.

From the foregoing it is apparent that a generator has been provided which is capable of efficiently utilizing run-of-crusher carbide; that it is possible to utilize such carbide and insure the complete and immediate reaction of the carbide dust and fines and still prevent their circulation throughout the water in the generator; that a control has been provided between a water spray and the carbide feeding mechanism so that minimum acetylene will be lost during the operation of the generator; and that a hopper feeding device has been provided which is capable of preventing the escape of acetylene from the hopper and the admission of air thereto while employing a single hopper inlet valve.

Although the various features of the improved generator have been shown and described in detail to fully disclose one embodiment of this invention, it will be evident that numerous changes may be made in such details, and certain features may be used without others, without departing from the principles of the invention.

We claim:

1. An acetylene generator adapted to utilize run-of-crusher carbide comprising a tank adapted to contain water; a carbide hopper; a carbide feed chute for delivering the large lumps of carbide from said hopper to a point below the level of the water within said tank, and for confining a portion of the water in said tank separately from the remainder thereof, said chute also constituting means for retaining the carbide fines within such confined portion of water; and a common chamber for collecting the acetylene generated by all of the carbide.

2. An acetylene generator adapted to utilize run-of-crusher carbide, comprising a tank adapted to contain water in its lower portion and to form a gas-collecting chamber thereabove; a carbide hopper; an overflow in said tank; a chute communicating with the outlet of said hopper and extending below the level of the water in said tank for delivering carbide to the water in said tank; a water spray within said chute; a vent in the wall of said chute below said overflow and above the lower end of said chute for delivering the acetylene generated therein to said gas collecting chamber; and a shield cooperating with said vent for preventing the circulation of the carbide fines throughout the water in said tank.

3. An acetylene generator adapted to utilize run-of-crusher carbide comprising a tank adapted to contain water and to confine acetylene thereabove; a carbide hopper; a device having an open lower end for delivering carbide from said hopper to the water within said tank and for confining a portion of said water thereby to prevent the circulation of the carbide fines throughout the main body of said water; a water overflow in the side wall of said tank; means for feeding water to said tank at such a rate that the reaction between the carbide and water will raise the temperature of the latter to a point where substantially a minimum of acetylene will be retained in solution in the water passing through said overflow; a trap connected to said overflow to prevent any loss of acetylene through said overflow; and means connected to said device below said overflow and above the lower open end of said device for delivering the acetylene generated therein through the main body of said water to the space above the main body of said water.

4. An acetylene generator as claimed in claim 3, in which such water-feeding means includes a water spray within said device whereby the water sprayed therefrom thoroughly wets said carbide fines as they are delivered to said confined portion of water.

5. An acetylene generator as claimed in claim 3, in which said device comprises a chute adapted to deliver the carbide into said confined portion of water; and in which such water-feeding means includes a spray within said chute and a temperature-controlled auxiliary water-feeding means.

6. The method of generating acetylene which comprises feeding run-of-crusher carbide to water within a tank; directing the lumps of carbide to a point below the level of the water within said tank; confining the carbide fines to a restricted portion of the water within said tank; agitating the surface of such restricted portion of said water by spraying the same with jets of water; conveying the acetylene generated by the reaction of the carbide fines and the restricted portion of water to a space above the remainder of the water within said tank; and preventing the circulation of the carbide fines throughout the water within said tank.

7. The method of generating acetylene which comprises feeding run-of-crusher carbide to water within a tank having a water overflow; directing the lumps of carbide to a point below the initial water level in said tank, said initial water level being substantially below said water overflow; confining the carbide fines to a restricted portion of the water within said tank; and adding water to said tank at a rate whereby the reaction between the carbide and the water will effect a temperature increase of the latter to a point where substantially a minimum of acetylene will be dissolved in the water passing through said overflow, at least a portion of such added water being sprayed onto the surface of the restricted portion of the water in said tank.

8. An acetylene generator comprising a tank adapted to contain water in its lower portion, and to confine acetylene above said water; a carbide hopper having an outlet communicating with the interior of said tank; a single inlet valve adapted to close the top of said hopper; and a valveless device connected to said single valve for charging said hopper with calcium carbide without admitting air into said hopper and without permitting the escape of gas therefrom to the atmosphere, said device comprising a hollow open-ended element having a relatively long throat portion narrowing from inlet to outlet so gradually that run-of-crusher carbide forms a substantially air-tight seal therein.

9. An acetylene generator as claimed in claim 8, in which said throat portion narrows at a rate of the order of one inch per foot; and comprising means connected to said hopper for preventing the accumulation of excessive pressure within said hopper when it is being charged.

10. An acetylene generator as claimed in claim 8, in which said hopper is provided with a by-pass leading to said tank at a point above said water for permitting acetylene confined within said hopper to flow into said tank; and said by-pass is provided with a valve.

11. An acetylene generator comprising a tank adapted to contain water in its lower portion, and to confine acetylene above said water; a carbide hopper adapted to deliver carbide to the water within said tank; a single inlet valve adapted to close the top of said hopper; a device having a constricted throat portion; a by-pass leading from said hopper to said tank, above said water; a valve in said by-pass; and means for simultaneously opening such by-pass valve and the said hopper inlet valve.

12. An acetylene generator comprising a tank adapted to contain water in its lower portion and to confine acetylene above said water, and provided with a water overflow; a carbide hopper having a single inlet valve; means for feeding run-of-crusher carbide from said hopper to the water in said tank; means for charging said hopper without admitting air thereto while preventing the escape of acetylene therefrom to the atmosphere, such charging means including a hollow open-ended device having a relatively long gradually-tapered throat portion; means for adding water to the water in said tank by a spray directed onto the carbide as it is fed from the hopper to the water in said tank, such last-mentioned means including a flow indicator whereby said spray may be controlled so that the rate at which the water is added is such that the reaction between the carbide and water will effect an increase in the latter's temperature to a point where substantially a minimum of acetylene will be retained in solution in the water.

13. An acetylene generator comprising a tank adapted to contain water in its lower portion, to confine acetylene above said water, and provided with a water overflow; a carbide hopper having a single inlet valve; a chute having an open lower end for feeding run-of-crusher carbide from said hopper to the water in said tank and adapted to confine therein a portion of the water in said tank; means for charging said hopper without admitting air thereto while preventing the escape of acetylene therefrom to the atmosphere, such charging means including a hollow open-ended device having a relatively long gradually-tapered throat portion; a water spray within said chute adapted to wet the carbide as it is fed from the hopper to the water in said tank and for vigorously agitating the surface of the confined portion of water; and means associated with said chute below said overflow and above said open lower end for delivering the acetylene generated within said chute to the space in said tank where the acetylene is confined.

14. An acetylene generator comprising, in combination, a tank adapted to contain water and providing a gas-collecting space above the level of such water; a carbide hopper; a carbide feed chute having an inlet end communicating with said hopper and an outlet end disposed below the level of the water in said tank, said chute being constructed and arranged to confine a portion of such water separately from the remainder thereof, and having vent means located above said outlet end for venting acetylene generated within said chute through the water within said tank.

15. An acetylene generator as claimed in claim 14, in which the main axis of said chute is substantially vertical, so that the carbide flows by gravity down said chute; and including spraying means constructed and arranged in said chute above said vent means to spray water transversely of and onto the descending carbide within said chute.

16. An acetylene generator as claimed in claim 14, in which said vent means comprises holes extending through the wall of said chute within said tank.

17. An acetylene generator comprising, in combination, a tank adapted to contain water and providing a gas-collecting space above the level of such water; a carbide hopper; a carbide feed chute having an inlet end communicating with said hopper and an outlet end disposed below the level of the water in said tank, said chute being constructed and arranged to confine a portion of such water separately from the remainder thereof; vent means comprising a row of holes extending through the wall of said chute within said tank; and an imperforate shield extending circumferentially of and attached to the outside of said chute adjacent said row of holes, said shield being spaced from and depending below the lower edges of said holes, to provide a water seal adjacent said holes.

18. An acetylene generator adapted to utilize run-of-crusher carbide consisting of a mixture of lumps of carbide and carbide fines, said generator comprising, in combination, a tank adapted to contain water and providing a gas-collecting space above the level of such water; a carbide hopper; a carbide feed chute having an inlet end communicating with said hopper and an outlet end extending below the level of the water in said tank, said chute being constructed and arranged to confine a portion of such water separately from the remainder of the water in said tank, and the main axis of said chute being substantially vertical so that the carbide flows by gravity down said chute into such confined portion of water, the carbide fines tending to float on the surface of such confined water and the lumps of carbide descending through such confined water thereby agitating the latter and the carbide fines thereon; means for spraying water into said chute, transversely of the axis of the chute, and against the carbide flowing down said chute; said chute having a circumferential row of holes extending through its wall below the normal level of water in said tank and between such spraying means and the outlet end of the chute, whereby acetylene generated within said chute is normally vented therefrom through water in said tank into said gas-collecting space; and an imperforate shield extending circumferentially of, and secured to the outside of, said chute adjacent to but spaced from said holes, to provide a water seal adjacent said holes.

19. An acetylene generator adapted to utilize run-of-crusher carbide comprising a tank adapted to contain water and to provide a gas-collecting space therein; a carbide hopper; means for feeding carbide from said hopper to the water within said tank, said means including a screw conveyor and a conveyor chamber communicating with a chute extending below the level of the water within said tank and adapted to confine a portion of the water within said tank separately from the remainder thereof; means for driving said conveyor to move said carbide from said hopper into said chute; and means within said chamber for preventing gravity flow of carbide fines past said screw conveyor when the latter is stationary.

20. An acetylene generator as claimed in claim 19, in which said means for preventing gravity flow of carbide fines past said screw conveyor comprises a block removably fixed within said chamber.

JAMES G. MARSHALL.
CHESTER A. SIVER.